United States Patent
Williams et al.

(10) Patent No.: US 8,876,170 B2
(45) Date of Patent: Nov. 4, 2014

(54) TAPERED DRIVE NUT FOR CONDUIT FITTING

(75) Inventors: Peter C. Williams, Cleveland Heights, OH (US); Dale C. Arstein, Highland Heights, OH (US)

(73) Assignee: Swagelok Company, Solon, OH (US)

( * ) Notice: Subject to any disclaimer, the term of this patent is extended or adjusted under 35 U.S.C. 154(b) by 84 days.

(21) Appl. No.: 13/266,186

(22) PCT Filed: Apr. 27, 2010

(86) PCT No.: PCT/US2010/032524
§ 371 (c)(1),
(2), (4) Date: Oct. 25, 2011

(87) PCT Pub. No.: WO2010/129261
PCT Pub. Date: Nov. 11, 2010

(65) Prior Publication Data
US 2012/0038150 A1  Feb. 16, 2012

Related U.S. Application Data

(60) Provisional application No. 61/172,835, filed on Apr. 27, 2009.

(51) Int. Cl.
*F16L 17/00* (2006.01)
(52) U.S. Cl.
USPC .......................... 285/342; 285/382.7; 285/354
(58) Field of Classification Search
USPC ............... 285/341–343, 354, 386, 247, 382.7
See application file for complete search history.

(56) References Cited

U.S. PATENT DOCUMENTS

| 2,350,017 A | 5/1944 | Davis |
| 2,530,017 A | 5/1944 | Davis |
| 2,508,763 A * | 5/1950 | Mercier .................. 285/341 |
| 3,215,457 A | 11/1965 | Teeters |
| 3,321,947 A | 5/1967 | Teeters |
| 3,402,949 A | 9/1968 | Mahoney |

(Continued)

FOREIGN PATENT DOCUMENTS

| DE | 19736765 | 2/1999 |
| WO | 01/20214 | 3/2001 |

(Continued)

OTHER PUBLICATIONS

International Search Report and Written Opinion from PCT/US10/32524 dated Aug. 27, 2010.

(Continued)

*Primary Examiner* — Aaron Dunwoody
(74) *Attorney, Agent, or Firm* — Calfee, Halter & Griswold LLP

(57) ABSTRACT

A drive nut for a fitting includes an interior socket centered on a central axis and configured to receive at least a rearward portion of a conduit gripping member. The socket is defined by a radial drive surface positioned to engage the conduit gripping member during pull-up, a first longitudinal surface radially outward of said drive surface and a tapered second longitudinal surface between the drive surface and the first longitudinal surface, wherein a conduit gripping device contacts the second longitudinal surface upon an initial pull-up and each remake. This geometry facilitates a greater number of available remakes by reducing lost stroke, and can provide less stroke loss for fittings pulled up by torque.

10 Claims, 9 Drawing Sheets

(56) References Cited

U.S. PATENT DOCUMENTS

| | | | |
|---|---|---|---|
| 3,695,647 | A | 10/1972 | Pugliese |
| 4,076,286 | A | 2/1978 | Spontelli |
| 4,690,437 | A | 9/1987 | Anderson et al. |
| 5,074,599 | A | 12/1991 | Wirbel et al. |
| 5,882,050 | A | 3/1999 | Williams et al. |
| 6,629,708 | B2 | 10/2003 | Williams et al. |
| 7,393,018 | B2 | 7/2008 | Williams |
| 7,407,196 | B2 | 8/2008 | Bennett et al. |
| 7,497,483 | B2 | 3/2009 | Williams et al. |
| 7,695,027 | B2 | 4/2010 | Williams et al. |
| 8,007,013 | B2 | 8/2011 | Arstein et al. |
| 2007/0164563 | A1 | 7/2007 | Arstein et al. |
| 2010/0140932 | A1 | 6/2010 | Williams et al. |
| 2010/0194107 | A1 | 8/2010 | Marshall |

FOREIGN PATENT DOCUMENTS

| | | |
|---|---|---|
| WO | 2007/087043 | 8/2007 |
| WO | 2009/003016 | 12/2008 |
| WO | 2009/018079 | 2/2009 |

OTHER PUBLICATIONS

Communication from European Application No. 12164312.6 dated Jul. 26, 2013.

* cited by examiner

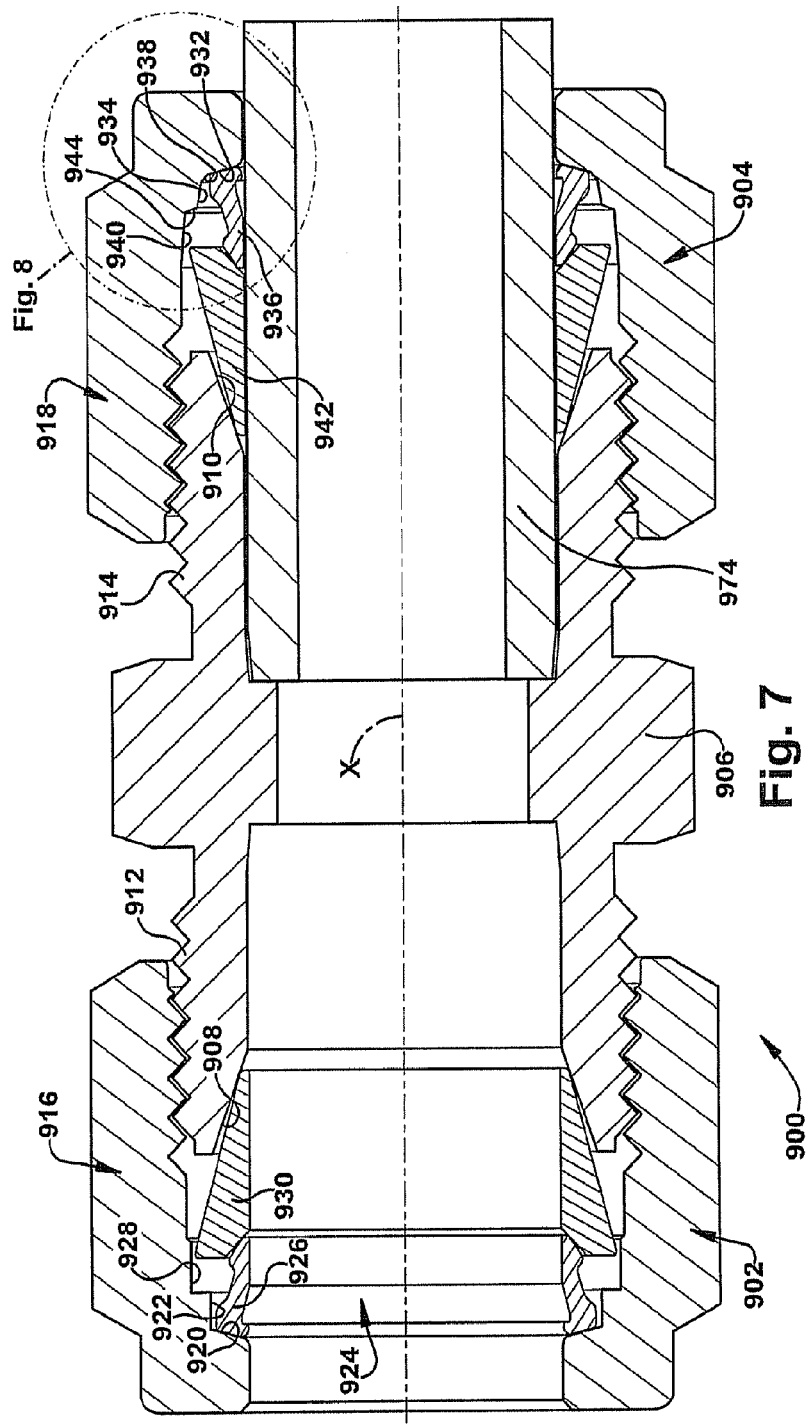

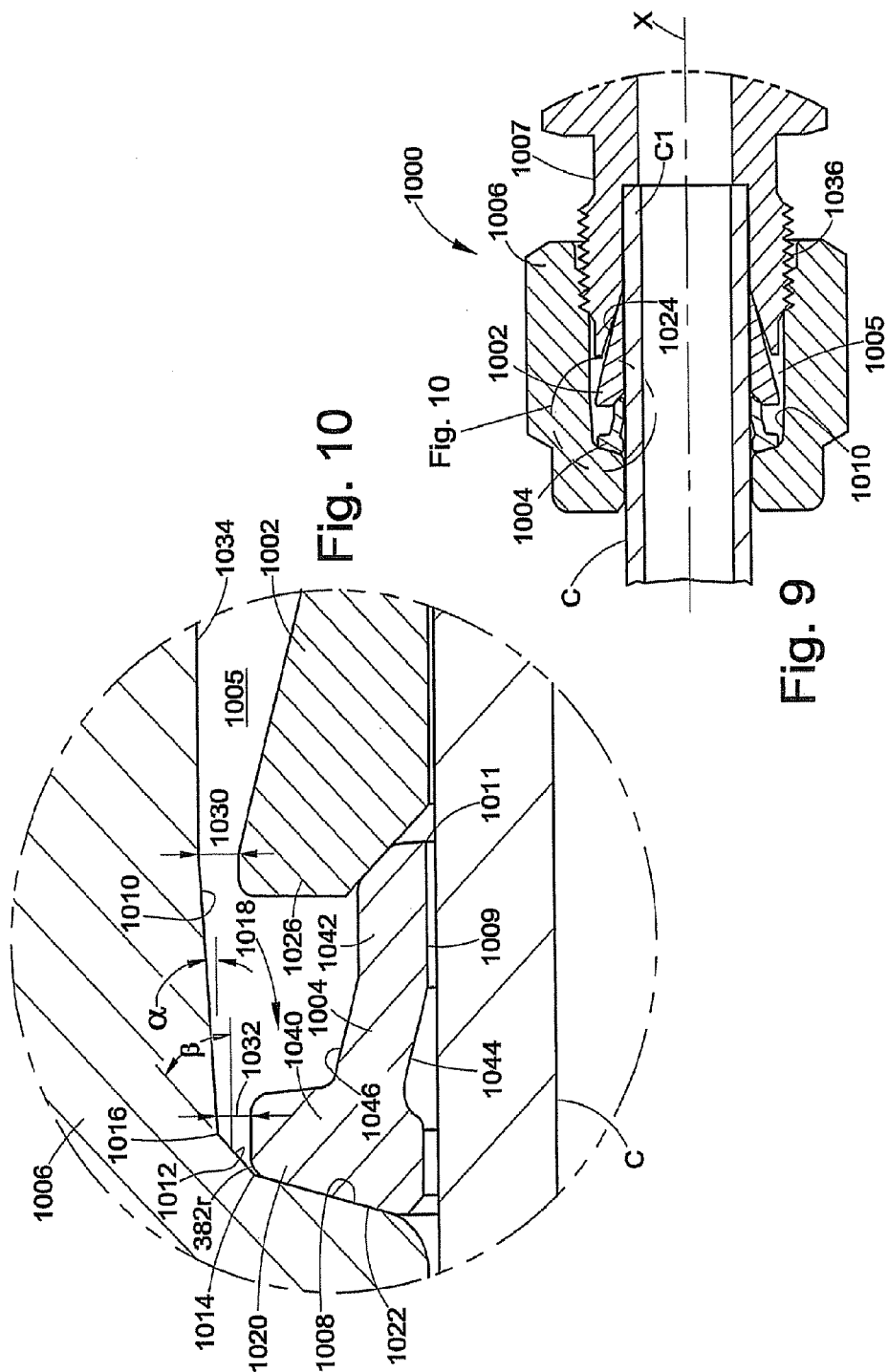

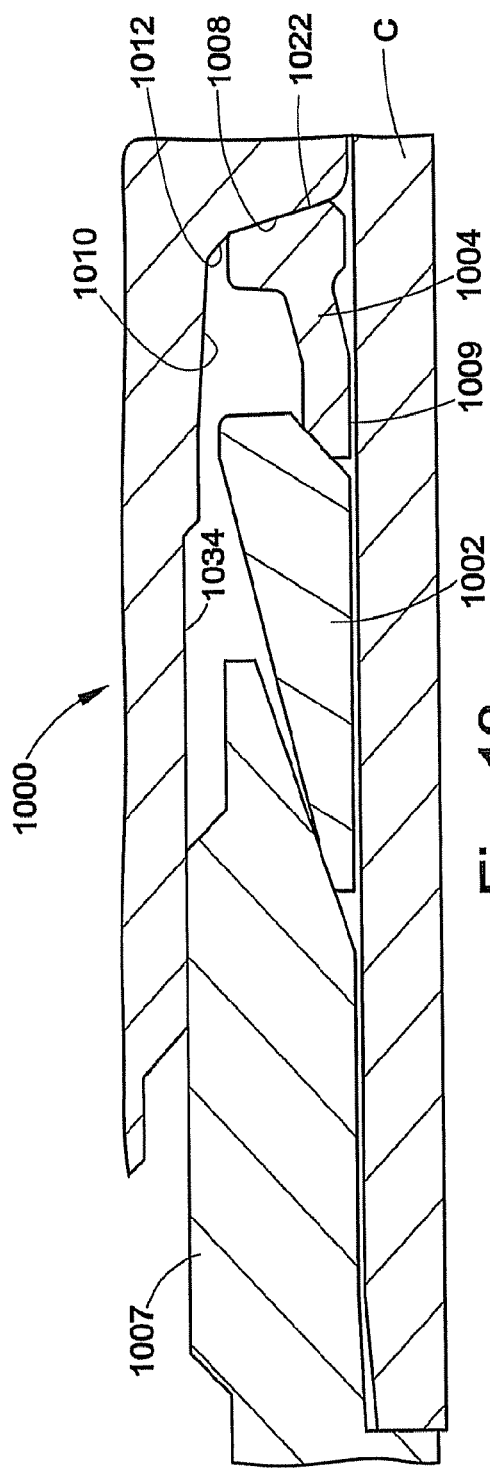
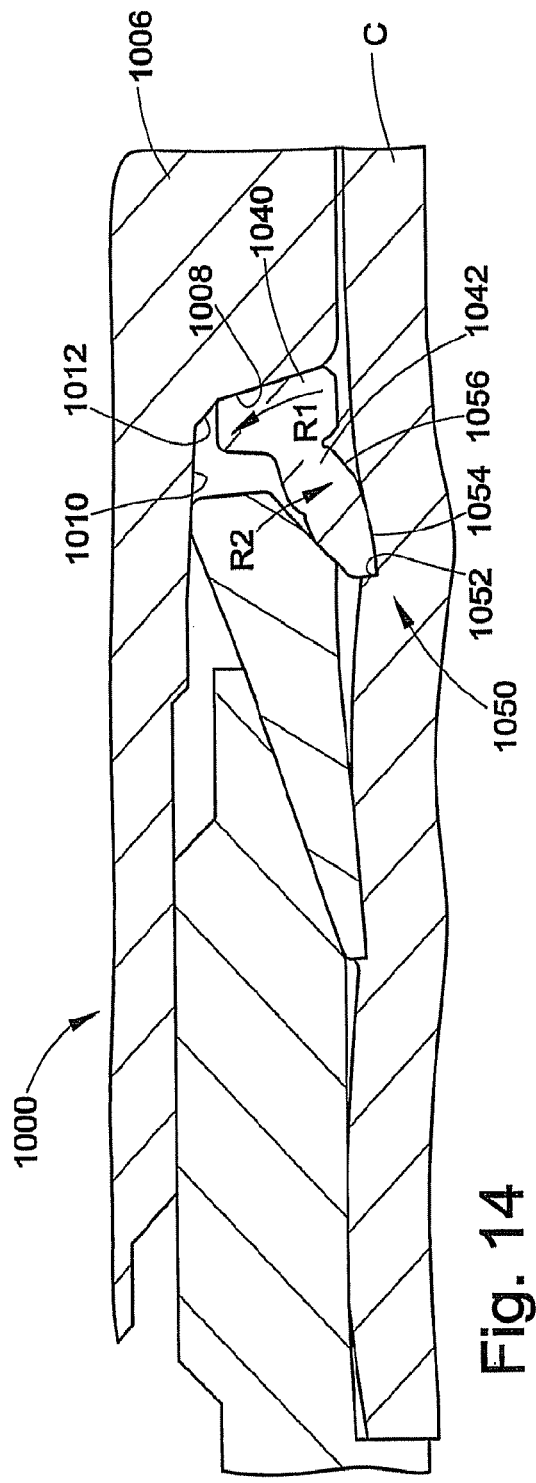
Fig. 13
Fig. 14

TAPERED DRIVE NUT FOR CONDUIT FITTING

CROSS-REFERENCE TO RELATED APPLICATION

This application is the U.S. national phase entry of PCT/US2010/032524, with an international filing date of Apr. 27, 2010, which claims the benefit of pending U.S. provisional patent application Ser. No. 61/172,835, entitled TAPERED NUT FOR TUBE OR PIPE FITTING and filed Apr. 27, 2009, the entire disclosure of which is fully incorporated herein by reference. This application also is a continuation-in-part of pending U.S. patent application Ser. No. 11/639,529 filed on Dec. 15, 2006 which claims the benefit of U.S. provisional application Ser. Nos. 60/758,688 filed on Jan. 13, 2006 and 60/834,548 filed on Jul. 31, 2006 entitled FITTING FOR TUBE OR PIPE, the entire disclosures of which are fully incorporated herein by reference. This application is also a continuation-in-part of pending U.S. patent application Ser. No. 12/670,269 filed on Jan. 22, 2010, which is a national stage entry of international application number PCT/US08/70991 filed on Jul. 24, 2008 which claims the benefit of U.S. provisional patent application Ser. No. 60/962,239, entitled TAPERED NUT FOR TUBE OR PIPE FITTING and filed Jul. 27, 2007, the entire disclosures of which are fully incorporated herein by reference.

BACKGROUND OF THE INVENTION

Fittings may be used to join or connect the end of a tube or other conduit to another member, whether that other member be another tube or conduit end such as through T-fittings and elbow fittings, for example, or a device that needs to be in fluid communication with the tube end, such as for example, a valve. One type of fitting uses a gripping arrangement including two ferrules that provide a gripping and sealing action between a tube and a body under the influence of a female threaded drive nut. Other types of fittings are also known, such as, for example, single ferrule fittings, fittings that use other types of tube gripping devices, and fittings that use male threaded drive nuts.

Tube fitting components that are radially displaced or expanded upon pull-up take up a portion of the deformation energy of pull-up and may contact radially adjacent and/or radially nearby fitting component surfaces as a result of the expansion or displacement. For example, the tubing inboard of the tube gripping member, such as, for example, the front ferrule of a two ferrule fitting or the ferrule of a single ferrule fitting, may expand radially outward during fitting pull-up and takes up a portion of the deformation energy of pull-up.

SUMMARY OF THE INVENTION

The application pertains generally to a fitting assembly that is configured to assist in separating two or more fitting components during disassembly of the fitting if and when the mating components contact each other during pull-up, for example, due to radially outward movement of a fitting component as a result of axial compression of the fitting component during fitting installation. As used herein, fitting components of a fitting assembly may include, but are not limited to, bodies, such as, for example, coupling bodies and valve bodies, drive nuts, tube gripping members, such as, for example, ferrules, tubing or other conduits, and fitting installation tools, such as, for example, tube gripping member installation tools or pre-swaging tools.

According to one inventive aspect, one or more fitting component engaging surfaces may be configured to reduce radial reaction forces between two contacting fitting components of a pulled-up fitting. For example, a surface of a first fitting component that is axially aligned with a second fitting component during fitting assembly may be radially recessed to provide reduced radial reaction forces between the recessed surface and the second component during disassembly. As used herein, two components are "axially aligned" if a portion of the first component is located at the same axial position (e.g., a position along a fitting) as a portion of the second fitting component. As another example of fitting components configured to reduce radial reaction forces resulting from contact between fitting components of a pulled-up fitting, a surface of a first fitting component that contacts a second fitting component during fitting assembly may be axially shortened to reduce a length of contact between the first and second components and, as a result, to provide reduced radial reaction forces between the first and the second components during disassembly.

According to another inventive aspect, one or more fitting component mating surfaces may additionally or alternatively be configured to produce an axial component of reaction force between two contacting fitting components of a pulled-up fitting. This axial component of elastic reaction force may assist in separating the two fitting components during disassembly of the pulled-up fitting. For example, a first fitting component may include a stepped wall surface, which may, for example, include a tapered surface, that contacts a second fitting component during fitting pull-up (e.g., during initial fitting pull-up and/or during a subsequent re-make) to produce an axial component of reaction force, which may assist in separation of the first and second fitting components when the fitting is disassembled.

Accordingly, in one exemplary embodiment, a fitting assembly has a first fitting component having a stepped wall surface and a second fitting component radially spaced from the tapered longitudinal surface when the fitting assembly is in a finger tight condition prior to pull-up. When the second fitting component is radially displaced into contact with the stepped wall surface during fitting pull-up, the stepped wall surface assists in separating the first fitting component from the second fitting component upon fitting disassembly. For example, engagement of the second fitting component with the stepped wall surface may produce an axial component of reaction force that assists in axially moving the second fitting component away from the first fitting component. As another example, the stepped wall surface may provide for a reduced radial reaction force between the first and second fitting components upon initial axial movement of the second fitting component during fitting disassembly.

In another embodiment, a drive nut is provided with an inner wall having a tapered longitudinal surface, such that when a tube gripping member that is assembled with the drive nut and a fitting body is displaced into contact with the tapered longitudinal surface, an axial component of elastic reaction force resulting from this contact may assist in separating the tube gripping member from the drive nut upon disassembly of the fitting. Additionally, the tapered condition of the longitudinal wall may reduce the radial force between the drive nut and the tube gripping member during separation of the tube gripping member from the drive nut, for example, by providing radial separation between the tube gripping member and at least a portion of the tapered surface during fitting disassembly.

In another embodiment, a drive nut has a drive surface that engages a back end of a conduit gripping member, and this drive surface is typically formed at an angle relative to a central longitudinal axis of the tube fitting. A first tapered surface is provided that extends axially away from the nut drive surface. A second tapered surface is disposed between the drive surface and the first tapered surface to further enhance the benefits of the drive surface. For example, the second tapered surface may reduce pull-up torque, may provide axial reaction forces to assist in disassembly of the fitting and may reduce radial forces between the conduit gripping member and the nut after pull-up. The second tapered surface may also assist in centering the conduit gripping member within the nut socket.

In still another embodiment, a tube fitting includes a tube gripping device having a first ferrule, a fitting body having a tube end socket for receiving a tube end, and a drive nut for assembly with the fitting body. The drive nut includes a recessed portion sized to receive the first ferrule. The recessed portion includes a radial drive surface for driving the first ferrule into engagement with a tube end during pull-up on the fitting body; a first tapered longitudinal surface that is radially spaced from a radially outer surface of the first ferrule when the tube fitting is in a finger-tight condition; and a second tapered longitudinal surface between the drive surface and the first tapered longitudinal surface. The second tapered longitudinal surface is angled with respect to both the drive surface and the first tapered longitudinal surface. When the drive nut is pulled up with the fitting body (e.g., during initial fitting pull-up or during a subsequent re-make), the first ferrule is radially displaced into contact with the first tapered longitudinal surface.

In yet another embodiment, a method of assembling a tube fitting with a tube end is contemplated for a tube fitting having a fitting body, a drive nut, and a ferrule. The tube end is inserted into a tube end socket of the fitting body. The ferrule is positioned in a recessed portion of the drive nut. The drive nut is assembled with the fitting body to a finger-tight position, such that the ferrule engages a radial drive surface of the drive nut and is radially spaced from a first tapered longitudinal surface of the drive nut by at least a portion of a second tapered longitudinal surface disposed between the drive surface and the first tapered longitudinal surface. The drive nut is pulled up on the fitting body, such that the ferrule is radially displaced into contact with the first tapered longitudinal surface.

In another embodiment, a tapered or angled longitudinal surface may be provided in a drive nut for a fitting wherein the tapered or longitudinal surface extends from a drive surface to another longitudinal surface. The tapered or angled longitudinal surface may be used to contact a conduit gripping device during pull-up and remakes to constrain axial misalignment during pull-up. This concept may be used, for example, with a fitting assembly in which a conduit gripping device deforms during pull-up by having a back end rotate away from the conduit and into contact with the tapered or angled longitudinal surface.

Further advantages and benefits will become apparent to those skilled in the art after considering the following description in conjunction with the accompanying drawings.

BRIEF DESCRIPTION OF THE DRAWINGS

FIG. 7 illustrates a sectional view of another embodiment of a tube fitting, having a drive nut with tapered interior surfaces on the right half of the drawing and a known drive nut on the left half of the drawing, in longitudinal cross-section;

FIG. 9 illustrates another embodiment of a fitting assembly with a drive nut having a centering tapered surface, shown in longitudinal cross-section and in a finger-tight position;

FIG. 10 is an enlarged view of the circled portion of FIG. 9;

FIGS. 13-14 are graphical representations for the fitting of FIG. 10, shown in half-longitudinal cross-section, for a finger-tight position and in a normal complete pull-up position.

DETAILED DESCRIPTION OF EXEMPLARY EMBODIMENTS

Figure 1:
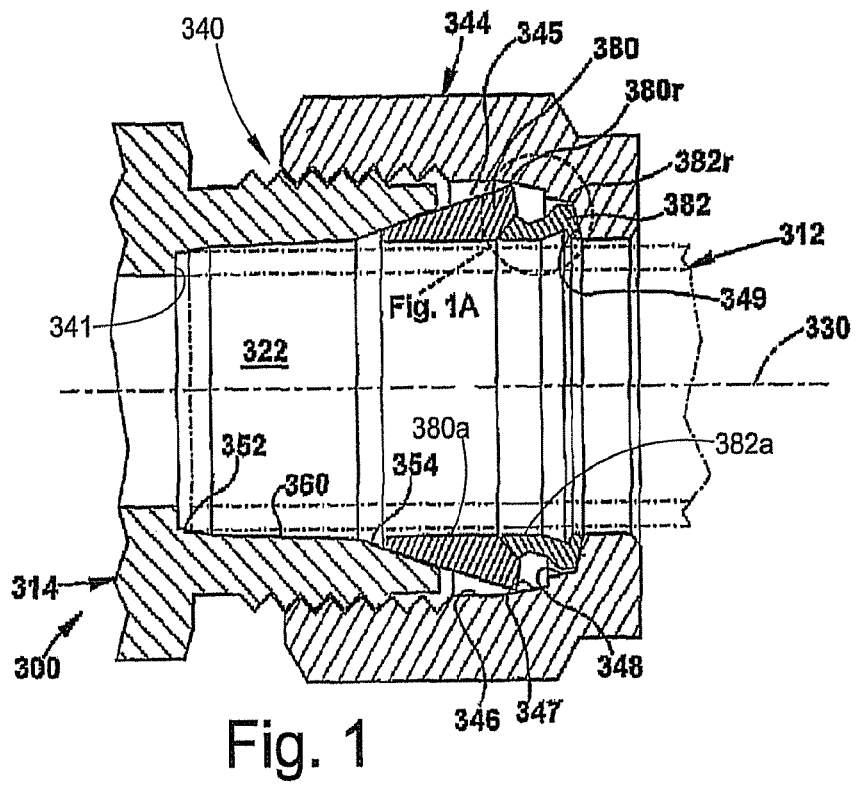
FIG. 1 is a partial sectional view of a tube fitting having a drive nut with a tapered inner wall surface, shown in a finger tight condition before pull-up of the fitting.

This disclosure relates to fitting components, for use with any type of fluid conduit, including tube or pipe. The exemplary embodiments are described herein with the terms "tube" and "tubing," but may be used with pipe and other conduits. The disclosure is applicable to fitting components of varying constructions, materials, sizes, and dimensions such as diameters, for example, all of which are described herein with the term "tube fitting." The tightening or preparation of a fitting connection is referred to herein as fitting "pull -up" or "make up," with both terms being used interchangeably. Fitting pull-up or make up is not limited to a specific pull-up position. Although the exemplary embodiments herein are described with reference to stainless steel conduits and fitting components and ferrules, such description is not intended to be limiting. The inventions herein will find application to fitting assemblies comprising many different types of metals including but not limited to many different high alloy steels Tube fitting components that are radially displaced or expanded upon fitting pull-up may contact radially adjacent and/or radially spaced fitting component surfaces as a result of the expansion or displacement. Examples of this radially outward movement include bowing or barreling of a tube end resulting from axial compression of the tube end, or outward deflection of portions of a tube gripping member, such as a ferrule or ferrules, during fitting pull-up. This contact may occur during initial pull-up of a fitting. Alternatively, this contact may not occur until a subsequent remake of the fitting, upon additional incremental displacement of the fitting component after two or more pull-ups of the fitting.

The present application contemplates providing a fitting that may be configured to assist in the separation of these contacting fitting components during disassembly of the fitting, for example, by reducing radial reaction forces (which tend to resist separation) between the components, or by increasing axial reaction forces (which tend to promote separation) between the components. According to one inventive aspect, this assistance in separating the components may be accomplished by providing a first fitting component with a recessed surface radially spaced from a surface that engages a displaced portion of a second component upon fitting pull-up. As the second component is separated from the first component during fitting disassembly, the displaced portion is axially aligned with the recessed surface, causing radial reaction forces between the first and second fitting components to be reduced, thus facilitating further separation of the first and second fitting components.

According to another inventive aspect, assistance in separating contacting first and second fitting components may be accomplished by providing the first fitting component with a tapered longitudinal surface for engagement with a displaced portion of the second fitting component. For example, a tube end socket may include a tapered longitudinal wall to assist in removal of a tube end. As another example, a drive nut may include one or more tapered longitudinal surfaces on an inner wall to assist in separation of the drive nut from a tube gripping device, such as, for example, a ferrule or ferrules. In yet another exemplary embodiment, both the tube end socket and the drive nut may include tapered longitudinal surfaces to assist in separation from the tube end and tube gripping device, respectively.

An exemplary type of fitting with which the invention can be used includes two ferrules that provide a gripping and sealing action between a tube and a body under the influence of a female threaded drive nut. While exemplary embodiments illustrated and described herein show various inventive aspects as used with this two ferrule type fitting, these inventive aspects are also applicable to other types of fittings, such as, for example, single ferrule fittings, fittings that use other types of tube gripping devices, and fittings that use male threaded drive nuts. Also, while exemplary embodiments include fittings for use with stainless steel tubing having diameters of ¼ inch (6.4 mm), ⅜ inch (12.7 mm), and ½ inch (19.0 mm), the inventive aspects of the present application may be provided with fittings for use with many sizes and types of tubing.

In accordance with other inventive aspects, one or more tapered longitudinal surfaces may be provided on one or more other fitting assembly components. In one embodiment, a tapered longitudinal surface may be provided on an inner wall of a drive nut of a fitting assembly to engage a portion of a tube gripping device assembled with the fitting when a portion of the tube gripping device is displaced outward and into contact with the inner wall of the nut during pull-up (e.g., during initial fitting pull-up, or after one or more subsequent pull-ups). This contact between the tapered longitudinal surface and the tube gripping device produces an axial component of an elastic reaction force against the tube gripping device, which can assist in separation of the nut from the tube gripping device upon fitting disassembly. FIGS. 1-14 illustrate exemplary embodiments of fittings including drive nuts having one or more of such tapered longitudinal surfaces.

Although the exemplary embodiments herein are presented in the context of a stainless steel tube fitting, the inventions herein are not limited to such applications, and will find use with many different conduits such as tube and pipe as well as different materials other than 316 stainless steel, including metals and non-metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs that use one or more conduit gripping devices. We use the term "ferrule set" to refer to a combination of conduit gripping devices with or without other parts that form the means by which conduit grip and seal are achieved. Although not necessary with all fitting designs, it is common that a ferrule set comprises two ferrules that are purposely matched to each other and to the fitting components, for example, based on material, manufacturer, interrelated design and geometry features and so on. In some fittings, in addition to the conduit gripping devices there may be one or more additional parts, for example seals. Therefore, the term "ferrule set" may also include in some embodiments the combination of one or more conduit gripping devices with one or more other parts by which the ferrule set effects conduit grip and seal after a complete pull-up. The inventions may be used with tube or pipe, so we use the term "conduit" to include tube or pipe or both. We generally use the term "fitting assembly" or "fitting" interchangeably as a shorthand reference to an assembly of typically first and second fitting components along with one or more conduit gripping devices. The concept of a "fitting assembly" thus may include assembly of the parts onto a conduit, either in a finger-tight position, a partial pull-up position or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether a direction is towards the center of a fitting (inboard) or away from the center (outboard). In the drawings, various gaps and spaces between parts (for example, gaps between the ferrules and the conduit in a finger-tight position) may be somewhat exaggerated for clarity or due to scale of the drawings.

Figure 2:
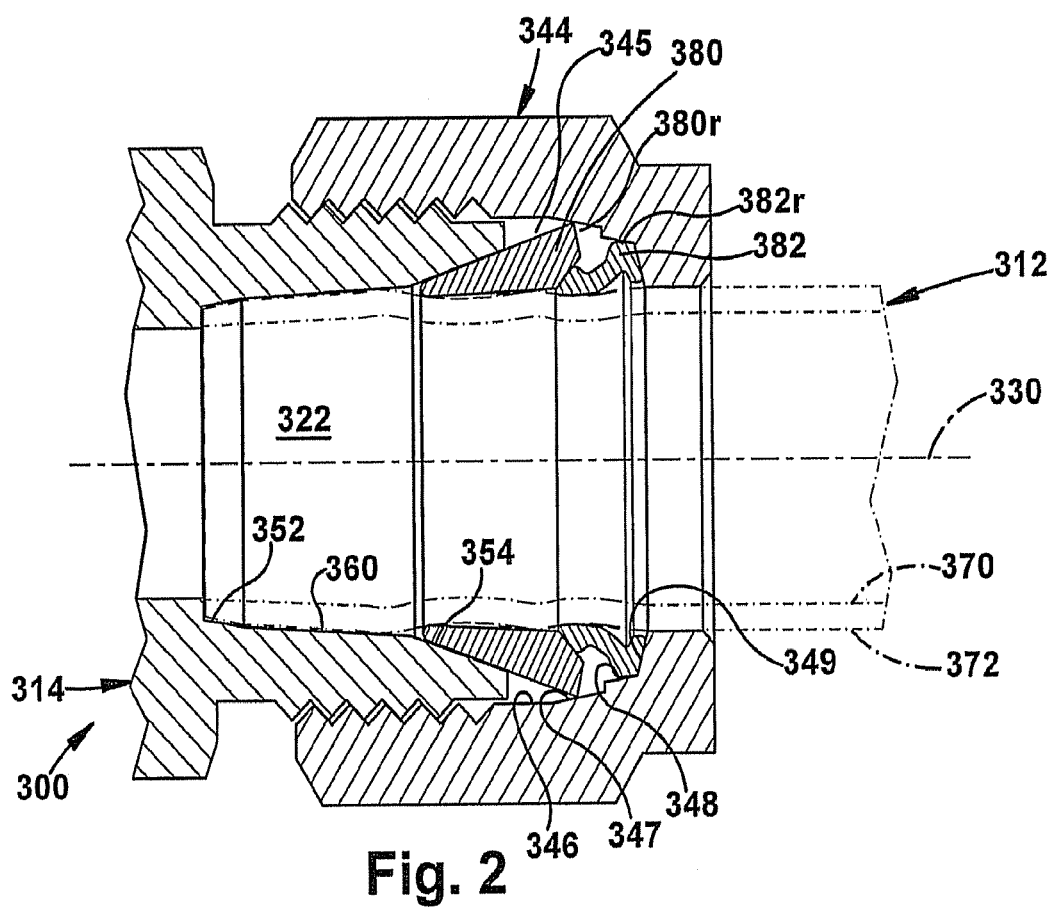
FIG. 2 is a partial sectional view of the tube fitting of FIG. 1 in a pulled-up condition.

With reference to FIGS. 1 and 2, but also applicable to the other embodiments herein, a first embodiment of one or more of the inventions is presented. Note that in many of the drawings, for example FIG. 3, a fitting assembly may be illustrated in partial longitudinal cross-section, it being understood by those skilled in the art that the fitting components and conduit gripping devices are in practice annular parts about a longitudinal centerline axis X. All references herein to "radial" and "axial" and "on-axis" and "off-axis" are referenced to the X axis except as may otherwise be noted. Also, all references herein to angles are referenced to the X axis except as may otherwise be noted.

In this example, a fitting assembly 300 may include a first coupling or fitting component 314 and a second coupling or fitting component 344. These parts are commonly known in the art as a body and nut respectively, wherein the body 314 receives a conduit 312 (also referenced as C in some of the figures) end shown in phantom in FIG. 1, and the nut 344 may be joined to the body 314 during make up of the fitting. Although we use the common terms of body and nut herein as a convenience, those skilled in the art will appreciate that the inventions are not limited to applications wherein such terminology may be used to describe the parts. The body 314 may be a stand-alone component as illustrated or may be integral with or integrated or assembled into another component or assembly such as, for example, a valve, a tank or other flow device or fluid containment device. The body 314 may have many different configurations, for example, a union, a tee, an elbow and so on to name a few that are well known in the art. Although the body 314 and nut 344 are illustrated as being threadably joined together by a threaded connection 340, threaded connections are not required in all uses. For example, some fittings have parts that are clamped together. Fittings are also commonly referred to in the art as male fittings or female fittings, with the distinction being that for a male fitting the male body 314 includes an externally threaded portion and the female nut 344 includes an internally threaded portion. For a female fitting, the male nut 314 would include an externally threaded portion and the female body includes an internally threaded portion. The exemplary embodiments herein illustrate a male fitting assembly embodiment, for example, but the inventions may be conveniently adapted for use with a female fitting assembly.

The fitting assembly 300 may be used to form a fluid tight connection between an end portion of the conduit 312 and the body 314 using one or more conduit gripping devices, which in the exemplary embodiments herein may be realized in the form of one or more ferrules. However, conduit gripping devices other than those that may be understood in the art as 'ferrules' may also be used with the inventions herein. The conduit 312 typically bottoms against a radial shoulder 341 that is part of the body 314, as is well known. The body 314 includes a tapered camming surface 354 that engages a front portion of a first or front conduit gripping device or ferrule 380. The front ferrule 380 includes a tapered camming surface at its back or outboard end that engages a front portion of a second or back conduit gripping device or ferrule 382. The back ferrule 382 includes a driven surface 382d that engages a drive surface 349 of the drive nut 344. The back ferrule front portion may optionally include a radially extending crown 382c. The front and back ferrules include cylindrical interior walls 380a, 382a that are closely received over the outer surface of the conduit 312. The back ferrule may optionally include one or more radial recesses 382b. Although the exemplary embodiments herein illustrate fitting assemblies that use a conduit gripping device or ferrule set having two conduit gripping devices or ferrules, the inventions will readily find application to fittings that may use only a single conduit gripping device, as well as fittings that may use ferrule sets having more than two conduit gripping devices, or additional parts other than just ferrules or conduit gripping devices, for example, additional seals.

It is important to note that the exemplary geometric shapes, configurations and designs of the fitting coupling components 314, 344 and the conduit gripping devices 380, 382 are a matter of design choice and will depend in great measure on the materials used, and the design and performance criteria expected of the fitting. Many different coupling components and conduit gripping device designs are known in the art and may be designed in the future.

The term "complete pull-up" and derivative terms as used herein refers to joining the fitting components together so as to cause the one or more conduit gripping devices to deform, usually but not necessarily plastically deform, to create a fluid tight seal and grip of the fitting assembly 300 on the conduit 312. A "partial pull-up" and derivative terms as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position or condition refers to the fitting components and conduit gripping devices being loosely assembled onto the conduit but without any significant tightening of the male and female fitting components together, usually typified by the conduit gripping device or devices not undergoing plastic deformation.

In order to effect complete conduit grip and seal, the nut and body are tightened together—commonly known in the art as pull-up or pulling up the fitting and derivative terms—such that the back ferrule 382 and front ferrule 380 axially advance against their respective camming surfaces. This causes a radially inward compression of the ferrules against the outer surface of the conduit 312 to effect conduit grip and seal. An outer conical surface of the front ferrule engages the body camming surface, while a conical or tapered surface of the back ferrule engages the frusto-conical camming surface of the front ferrule, as is well known. In the exemplary fitting assembly of FIGS. 1 and 2, conduit grip is primarily achieved with the back ferrule, with the front ferrule primarily providing a fluid tight seal. However, in some designs the front ferrule may also grip the conduit and the back ferrule may also provide a fluid tight seal. Thus, the term "conduit gripping device" may include two distinct functions, namely conduit grip and seal, whether or not a specific conduit gripping device performs one or both of those functions. The present inventions may alternatively be used with single conduit gripping device style fittings in which a single conduit gripping device performs both the conduit grip and seal functions, and still further alternatively may be used with fittings that use more than two conduit gripping and sealing devices. Although not limiting the scope of the present inventions, the exemplary fitting designs illustrated herein are well known and commercially available from Swagelok Company, Solon, Ohio. These fittings are also further described in a number of issued and pending patent applications, including U.S. Pat. Nos. 5,882,050 and 6,629,708 which are fully incorporated herein by reference. The exemplary fittings herein may operate as set forth in these patents, for example, or may have different designs that operate in different ways.

According to one embodiment, FIGS. 1 and 2 illustrate a two-ferrule tube fitting 300. The tube fitting 300 may be used for connection with a tube 312 and includes a fitting body 314. The fitting body 314 is merely representative of the various different types of assemblies and fittings with which the invention is usable. For example, the fitting body can be a standalone device, or a portion of a valve, or a union, or any other type of fluid control device or fluid flow device. Further, the fitting body 314 may, but need not, be provided with recessed or tapered longitudinal surfaces, such as, for example, the tapered tube capture and tube end socket wall surfaces described in co-pending PCT application Publication No. WO 2007/087043, filed Dec. 15, 2006, the entire disclosure of which is incorporated herein by reference. The particular tube fitting 300 that is shown in FIGS. 1 and 2 includes, in addition to the fitting body 314, a front ferrule 380, a rear ferrule 382, and a drive nut 344.

Figure 1A:
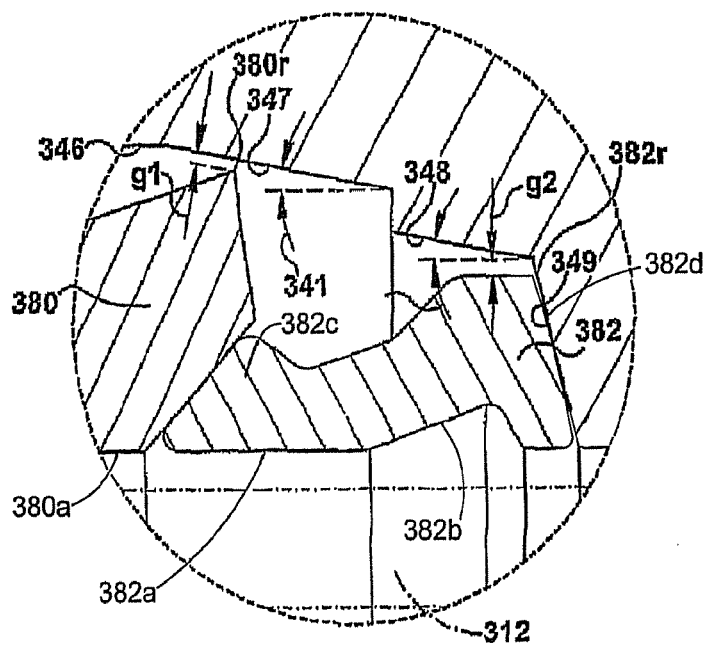
FIG. 1A is an enlarged sectional view of a portion of the drive nut and ferrules of the fitting of FIG. 1.

FIGS. 1 and 1A illustrate the fitting 300 in a finger tight condition prior to pull-up. The tube 312 is inserted through the nut 344 and into the socket 322. The front ferrule 180 is disposed in a first portion of a recess 345 in the nut 344, and the rear ferrule 382 is disposed in a second portion of the recess 345. Included in the recess is a frustoconical drive surface 349 for driving the ferrules 380, 382 into engagement with the tubing 312 during pull-up.

FIG. 2 illustrates the fitting 300 after pull-up. The drive nut 344 is screwed further onto the fitting body 314. The movement of the drive nut 344 causes the ferrules 380 and 382 to provide a gripping and sealing engagement between the tube 312 and the fitting body 314.

Axially and radially inward movement of a nose of the front ferrule 380 may cause an outer portion 380r of the front ferrule 380 to expand or deflect outward. Likewise, axially and radially inward movement of an inner, gripping portion of the rear ferrule 382 may cause an outer portion 382r of the rear ferrule 382 to expand or deflect outward. Under some circumstances, one or both of these outer portions 380r, 382r of the ferrules 380, 382 may contact an inner wall 346 of the drive nut 344 during pull-up. In the exemplary embodiment of FIGS. 1 and 2, tapered longitudinal surfaces 347, 348 are provided on the inner wall 346 at locations axially aligned with the front and rear ferrules 380, 382. It should be noted that in other exemplary embodiments, tapered longitudinal surfaces may be provided axially aligned with only one of the two ferrules, or one continuous tapered longitudinal surface on the inner wall may extend to be axially aligned with both ferrules (not shown). In the illustrated embodiment of FIGS. 1 and 2, when the outer portions 380r, 382r of the front and rear ferrules 380, 382 deflect during pull-up, as shown in FIG. 2, one or both of the outer portions 380r, 382r may contact a corresponding one or both of the tapered longitudinal surfaces 347, 348, resulting in both a radial and an axial component of reaction force.

The tapered condition of these inner wall surfaces 347, 348 can assist in separation of the nut 344 from one or both ferrules 380, 382 upon disassembly. The axial component of reaction force produced by contact between the tapered surfaces 347, 348 and the ferrule or ferrules 380, 382 can assist in separation of the nut 344 from either or both of the ferrules 380, 382. Once the ferrule or ferrules 380, 382 are initially broken free from the tapered wall surfaces 347, 348, the nut 344 may be separated without any substantial force, due to the resulting radial separation or reduction in radial reaction force between the ferrule or ferrules 380, 382 and the tapered wall surfaces 347, 348.

To provide both sufficient radial containment of the ferrules and a sufficient axial reaction force between contacting nut and ferrule surfaces during disassembly, the taper angles 341, 343 of the inner wall surfaces 347, 348 of the drive nut 344, as measured from the axis 330 of the drive nut, may, for example, each range from greater than 0° up to approximately 45°. These two angles 341, 343 may, but need not, be the same. In an exemplary embodiment, the taper angles 341, 343 may each range from about 5° up to about 30°, and in a more preferred, but not required embodiment, the tapered angles 341, 343 may each range from about 10° to about 20°. In the illustrated embodiment of FIGS. 1 and 2, the tapered wall surfaces 347, 348 each have a taper angle 341, 343 of about 10° relative to the axis 330.

As described above, the taper angle of the tapered wall surface in a drive nut may be selected to assist in separation of the drive nut from the tube gripping device, such as, for example, a ferrule or ferrules, if any portion of the tube gripping device is expanded or deflected radially outward into engagement with the inner wall of the drive nut during pull-up. Additionally, a gap between the outer portion or portions of the tube gripping device and the tapered longitudinal surface or surfaces of the drive nut in the fitting's pre-tightened, finger tight condition may be selected independently or in combination with the taper angle to provide a desired radial reaction load between the outer portions of the ferrule or ferrules and the inner wall of the drive nut, to assist in tightening the tube gripping device to the tube end. In an exemplary embodiment, as shown in FIG. 1A, a gap g1 is provided between the front ferrule outer portion 380r and the tapered longitudinal surface 347, and a gap g2 is provided between the rear ferrule outer portion 382r and the tapered longitudinal surface 348. The dimensions of these gaps and the taper angles of the tapered longitudinal surfaces may be varied to produce desired radial reaction forces during fitting pull-up, such as, for example, to produce radial reaction forces consistent with those experienced during pull-up of the fitting 300 with a nut having cylindrical (non-tapered) inner wall surfaces. As such, a drive nut 344 with tapered longitudinal surfaces may be interchangeable with a nut having cylindrical inner wall surfaces, thereby allowing use of the same fitting body and tube gripping device. In one such exemplary embodiment, a tube fitting 300 for ½ inch tubing includes a gap g1 of approximately 0.010 inches (0.25 mm) between the front ferrule 380 and the tapered longitudinal surface 347, and a gap g2 of approximately 0.009 inches (0.23 mm) between the rear ferrule 382 and the tapered longitudinal surface 348.

According to another inventive aspect, tapered longitudinal surfaces may be provided on multiple components of a fitting to assist in the separation of multiple sets of contacting fitting components during fitting assembly. In one embodiment, tapered longitudinal surfaces are provided both on an inner wall of a body tube socket and on an inner wall of a drive nut, for separation from the tube end and tube gripping device, respectively, during fitting disassembly. In the illustrated exemplary embodiment of FIGS. 1 and 2, in addition to the tapered longitudinal surfaces 347, 348 on the nut 344, as described above, a tapered intermediate socket wall surface 360 is provided between a tube capture portion 352 and a camming mouth 354, which may assist in separation of the fitting body 314 from the tube 312 during disassembly of the pulled-up fitting 300.

Figure 3:
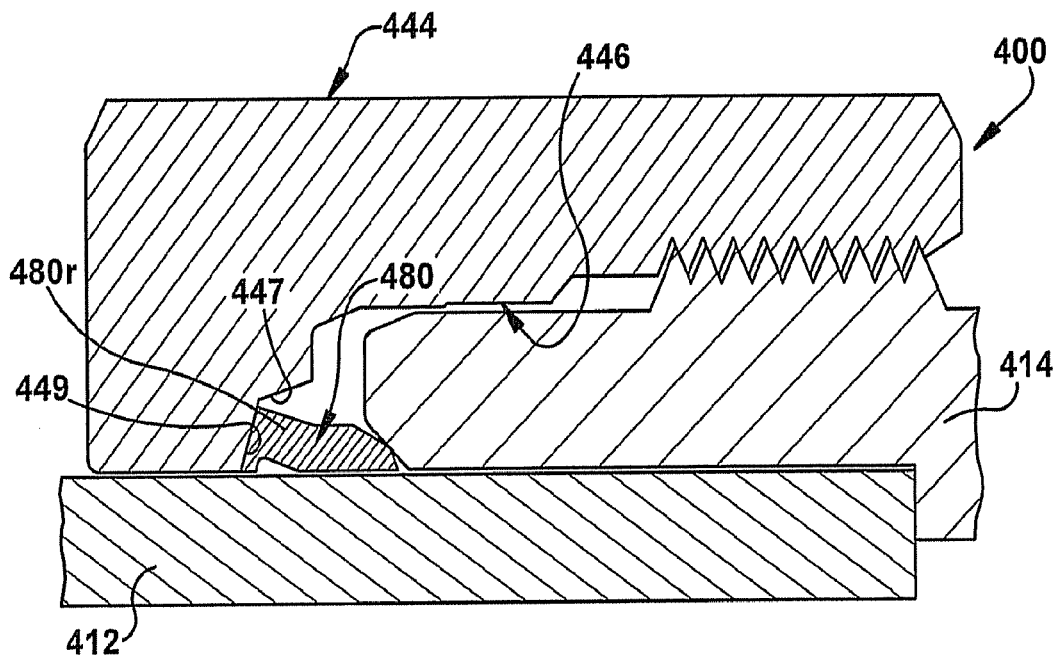
FIG. 3 is a partial sectional view of a single ferrule type tube fitting having a drive nut with a tapered inner wall surface, shown in a finger tight condition before pull-up of the fitting.
Figure 4:
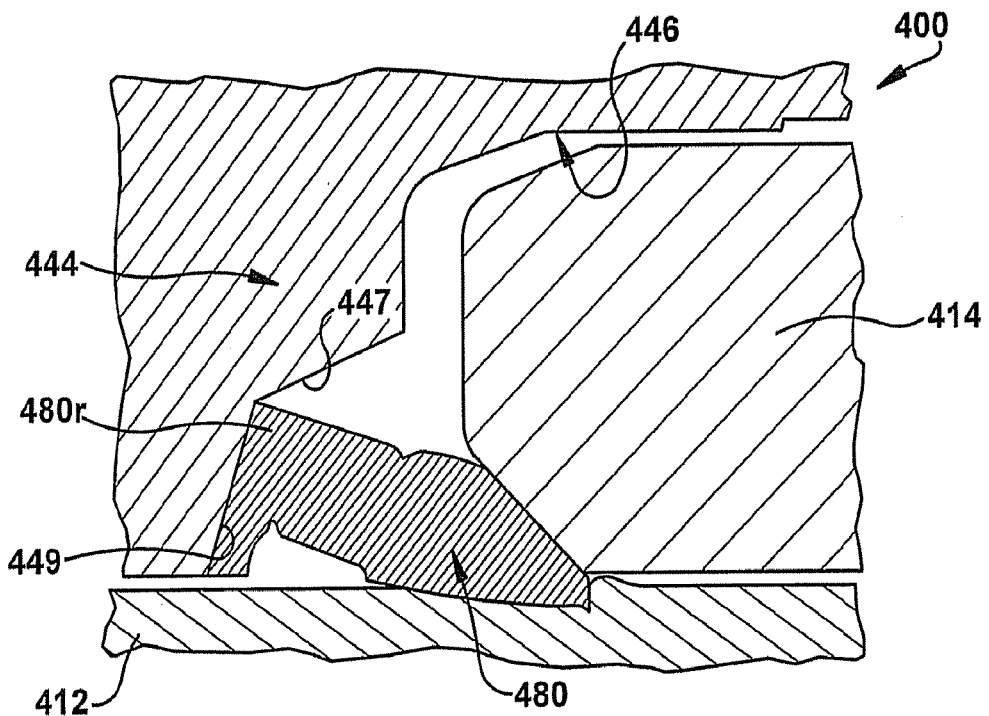
FIG. 4 is an enlarged partial sectional view of the tube fitting of FIG. 3 in a pulled-up condition.

FIGS. 3 and 4 illustrate a fitting 400 that is another exemplary embodiment in which a tapered longitudinal surface 447 is provided on an inner wall of a drive nut 444. The exemplary fitting of FIGS. 3 and 4 is a single ferrule design, similar to a single ferrule tube fitting described in U.S. Pat. No. 7,393,018, entitled Tube Fitting for Stainless Steel Tubing, the entire disclosure of which is fully incorporated herein by reference.

During pull-up of the illustrated tube fitting, axially and radially inward movement of a nose of the single ferrule 480 may cause an outer portion 480r of the single ferrule 480 to expand or deflect outward. Under some circumstances, this outer portion 480r of the ferrule 480 may contact an inner wall 446 of the drive nut 444 during pull-up, causing a radial reaction load between the outer portion 480r of the ferrule 480 and the inner wall 446 of the drive nut 444. In the exemplary embodiment of FIGS. 3 and 4, a tapered longitudinal surfaces 447 is provided on the inner wall 446 at a location axially aligned with and radially spaced from the ferrule 480. When the outer portion 480r of the ferrule 480 deflects during pull-up, as shown in FIG. 4, the outer portion 480r may contact the tapered longitudinal surface 447, resulting in both a radial and an axial component of reaction force. The tapered condition of the inner wall surface (as opposed to, for example, a cylindrical surface) can assist in separation of the nut 444 from the ferrule 480 upon disassembly, as the axial component of reaction force can assist in separation of the nut 444 from the ferrule 480. Once the ferrule 480 is initially broken free from the tapered wall surfaces 447, the nut 444 can be separated without any substantial force, because of the taper angle of the tapered longitudinal surface 447.

Figure 5:
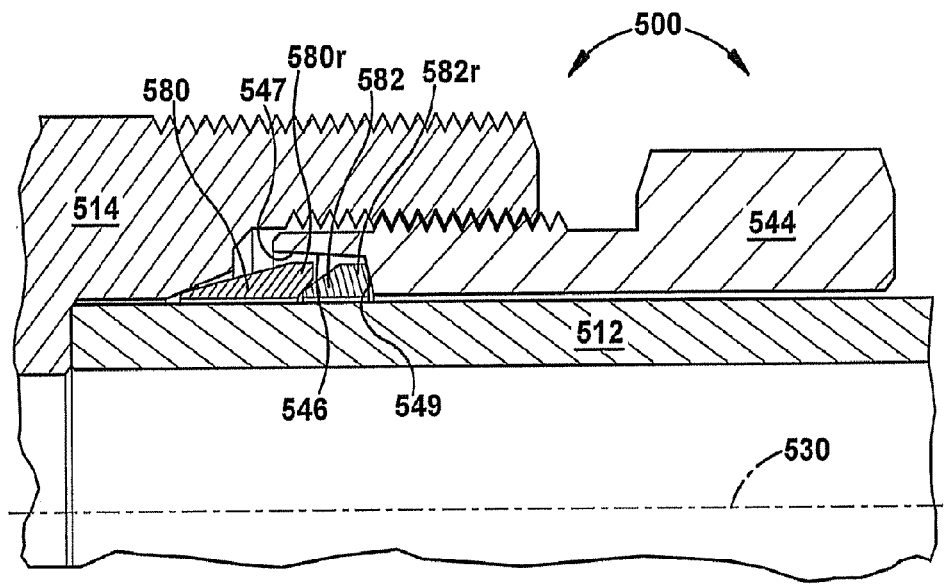
FIG. 5 is a partial sectional view of a tube fitting with a female threaded body and a male threaded drive nut with a tapered inner wall surface, shown in a finger tight condition before pull-up of the fitting.
Figure 6:
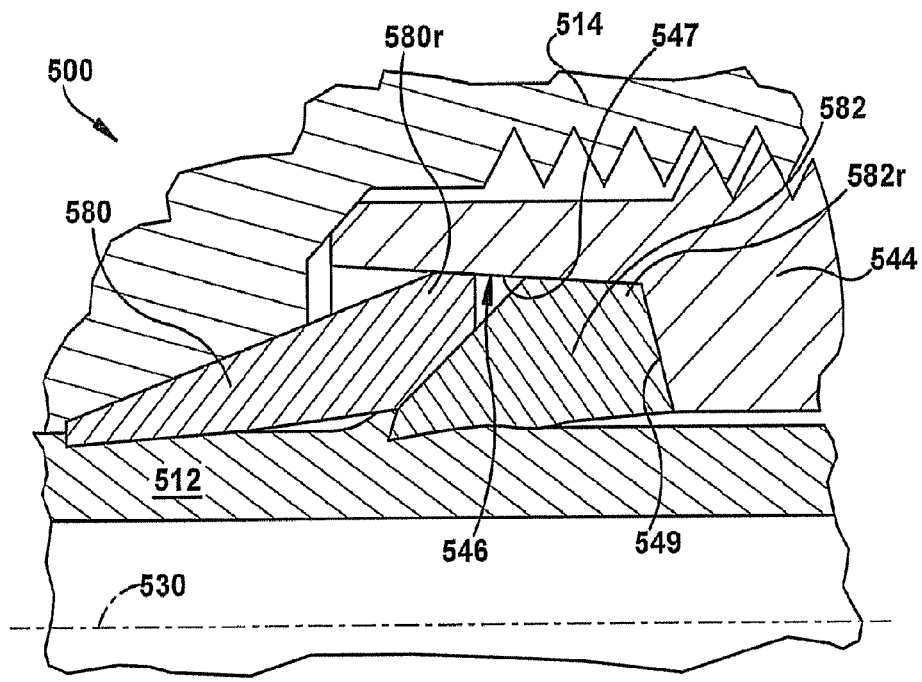
FIG. 6 is an enlarged partial sectional view of the tube fitting of FIG. 5 in a pulled-up condition.

FIGS. 5 and 6 illustrate a fitting 500 that is yet another exemplary embodiment in which a tapered longitudinal surface 548 is provided on an inner wall of a drive nut 544. The exemplary fitting of FIGS. 5 and 6 is a two-ferrule fitting of the type utilizing a male threaded drive nut 544 and a female threaded fitting body 514, similar to a tube fitting with male threaded drive nut described in co-pending application Ser. No. 11/112,800, published under Pub. No. US 2005/0242582 and entitled Fitting for Tube and Pipe, the entire disclosure of which is fully incorporated herein by reference.

During pull-up of the illustrated tube fitting, axially and radially inward movement of a nose of the front ferrule 580 may cause an outer portion 580r of the front ferrule 580 to expand or deflect outward. Likewise, axially and radially inward movement of the inner, gripping portion of the rear ferrule 582 may case an outer portion 582r of the rear ferrule to expand or deflect outward. Under some circumstances, one or both of these outer portions 580r, 582r of the ferrules 580, 582 may contact an inner wall 546 of the drive nut 544 during initial or subsequent fitting pull-up, causing a radial reaction load between the outer portion 580r, 582r of the ferrule or ferrules 580, 582 and the inner wall 546 of the drive nut 544. In the exemplary embodiment of FIGS. 5 and 6, a tapered longitudinal surface 547 is provided on the inner wall 546 at a location axially aligned with and radially spaced from the ferrules 580, 582. When the outer portions 580r, 582r of the ferrules 580, 582 deflect during pull-up, as shown in FIG. 6, one or both of the outer portions 580r, 582r may contact the tapered longitudinal surface 547, resulting in both a radial and an axial component of reaction force between the contacting surfaces. The tapered condition of the inner wall surface 547 (as opposed to, for example, a cylindrical surface) can assist in separation of the nut 544 from the ferrules 580, 582 upon disassembly, as the axial component of reaction force can assist in separation of the nut 544 from the ferrule or ferrules 580, 582. Once the ferrule or ferrules 580, 582 are initially broken free from the tapered wall surfaces 547, the nut 544 can be separated without any substantial force, because of the taper angle of the tapered longitudinal surface.

Figure 7A:
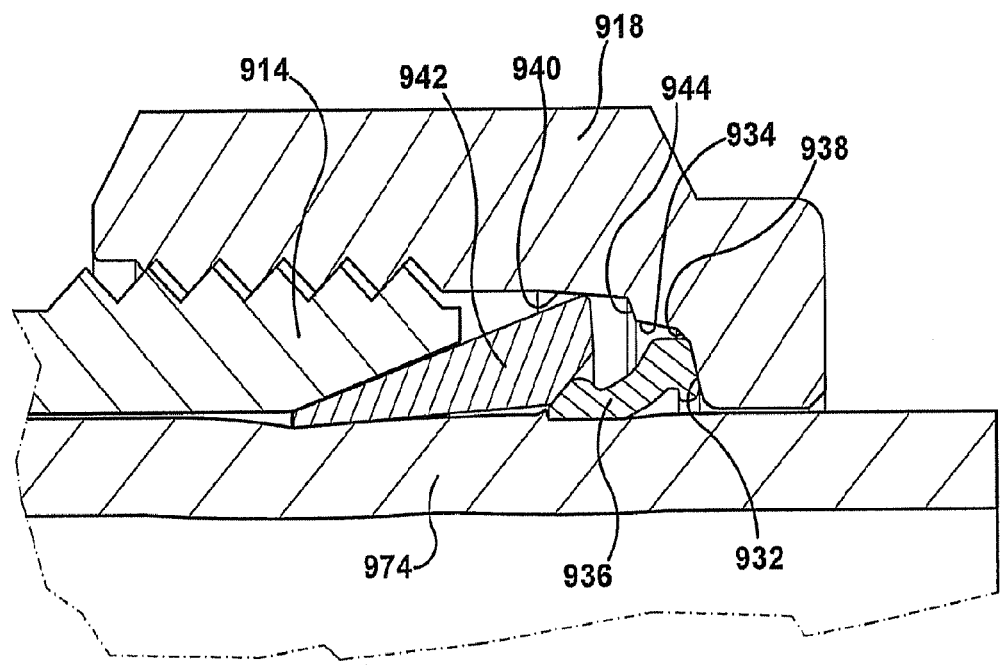
FIG. 7A illustrates a partial sectional view of the tube fitting of FIG. 7, shown in a pulled-up condition.
Figure 8:
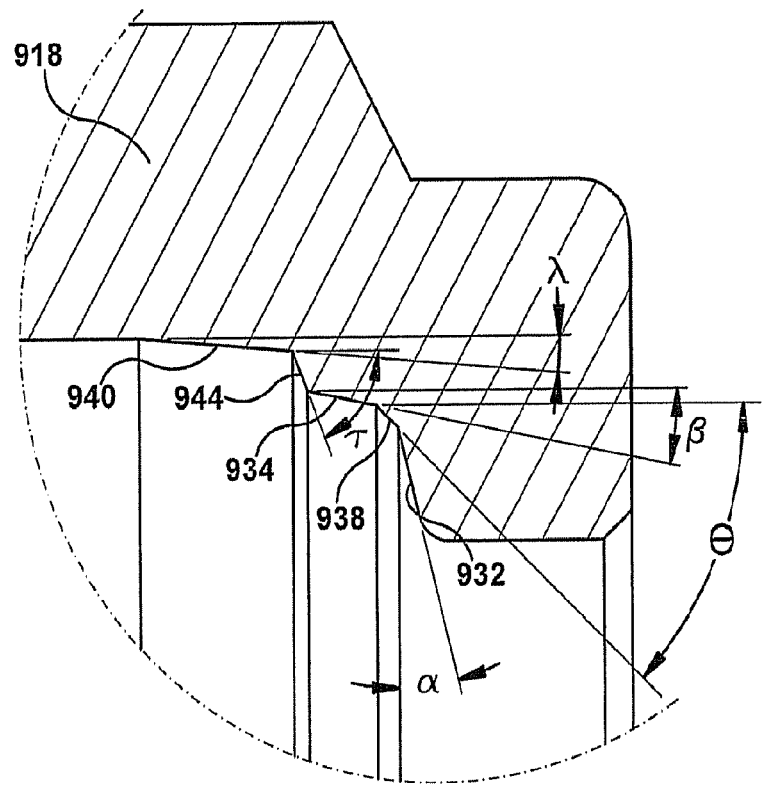
FIG. 8 is an enlarged illustration of the tapered interior surfaces of the drive nut of FIG. 7 with the back ferrule and conduit end omitted for clarity.
Figure 11:
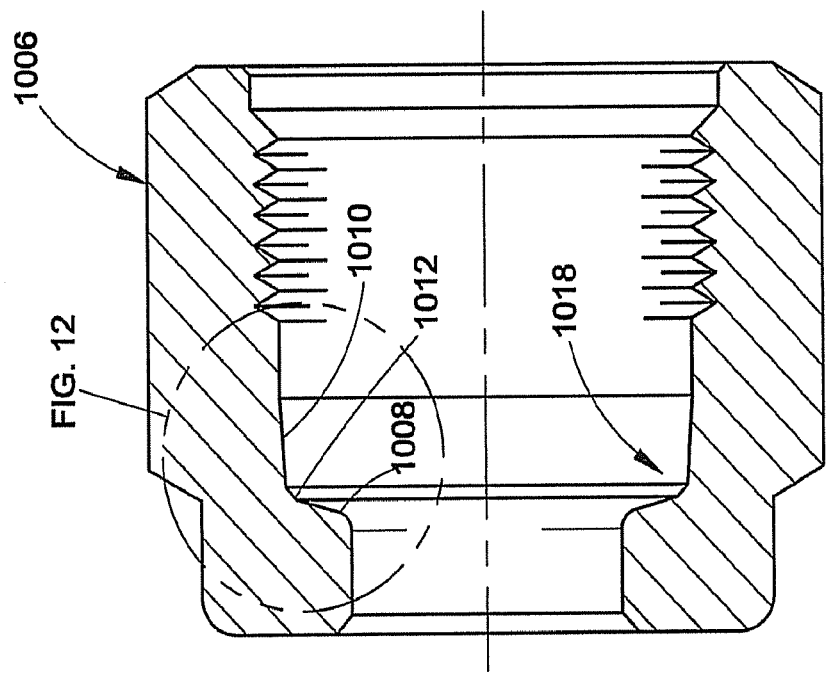
FIG. 11 illustrates the female nut of FIG. 9 in longitudinal cross-section.
Figure 12:
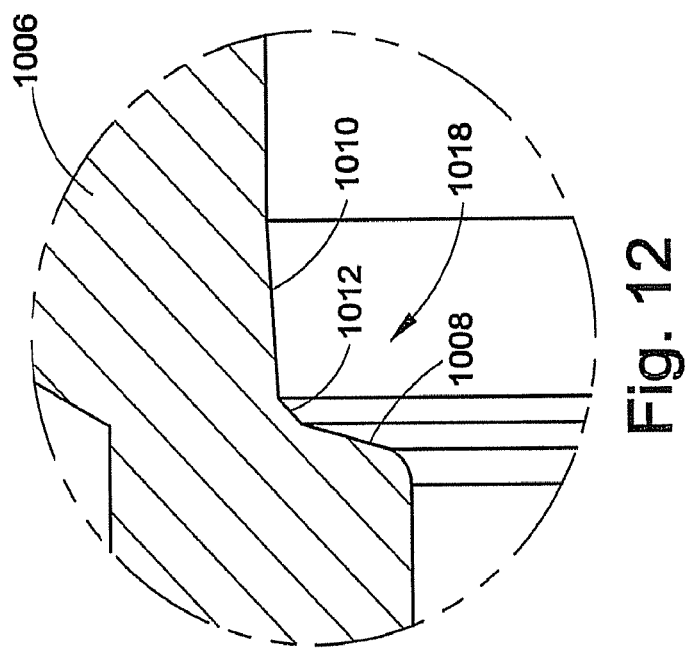
FIG. 12 is an enlarged view of the circled portion of FIG. 11.

With reference to FIGS. 7 and 8 we illustrate another embodiment of a drive nut that incorporates tapered interior surfaces that may come into contact with one or more conduit gripping members such as ferrules upon completed pull-up of the fitting. FIG. 7 illustrates a union fitting 900 with a traditional tube fitting 902 illustrated on the left half of the union (as viewed in the drawing) and a fitting 904 in accordance with this embodiment of the invention on the right half of the drawing. The illustration of a union is but one example of many different applications of the inventions herein and is provided only to serve as an exemplary use but is not a limitation on the use of the inventions described herein. The union 900 includes a body 906 having a central longitudinal axis X, and at each end a tapered frusto-conical surface 908 and 910 and male threaded outer surfaces 912 and 914. The male threaded ends 912, 914 mate with respective female threaded drive nuts 916 and 918. In the traditional fitting 902, the drive nut 916 includes a drive surface 920 that in cross-section as shown is conical and has a typical angle relative to an axis that is normal to the axis X of about 15° although other angles for the drive surface 920 may be and commonly are used, even as shallow as 5°. The traditional nut body 916 further includes a longitudinal surface 922 that extends axially from the drive surface 920 and that with the drive surface defines a socket 924 that receives a backend of a tube gripping device 926 such as, for example, a back ferrule 926 of a two ferrule assembly. The nut body 916 may further include a second longitudinal surface 928 that extends axially from the first longitudinal surface 922 to form another socket that may receive the back end of a front ferrule or front tube gripping device 930.

Turning now to the right half of the drawing of FIG. 7 as well as FIG. 8, in an embodiment of the invention, the socket that is formed to receive the back end of the rear ferrule or gripping device includes tapered surfaces. This embodiment is similar in many respects to the embodiments of FIGS. 1-6 hereinabove, but an additional tapered surface 938 has been added between the nut drive surface 932 and the first tapered surface 934 (see, for example, surface 348 in FIG. 1A). This additional tapered surface is particularly effective for fitting designs such as the one illustrated in FIG. 7 wherein the back end of the rear ferrule is designed to locate or be displaced away from and out of contact with the conduit upon complete pull-up, as part of a non-bowing hinging feature in which a central portion of the rear ferrule is radially deflected inward to swage against the wall of the conduit end 974 (see FIG. 7A).

The female nut body 918 thus includes a drive surface 932 that may be formed at a similar angle α as a traditional drive nut drive surface 920, or a different angle if needed for a particular fitting design. A first tapered surface 934 is provided that is radially outward of the drive surface 932, and extends axially away from the drive surface in a longitudinal direction and corresponds generally with the tapered surface 348 of FIG. 1A. This surface 934 is preferably axially aligned with a rearward portion of the rear ferrule 936 so that when the ferrule back end locates outwardly during pull-up, the ferrule back end can contact the tapered surface 934. The first tapered surface may be formed at an angle β with respect to the axis X, in a manner similar to the angle 343 in FIG. 1A, although different angle values may be used as required. For example, the angle β may be about 10°.

In contrast to the embodiment of FIGS. 1 and 1A, however, a second tapered surface 938 is provided between the drive surface 932 and the first tapered surface 934. This second tapered surface 938 provides a more gradual transition between the drive surface 932 and the first tapered surface 934 and may in some cases contact the back end of the rear ferrule when the fitting is assembled in a finger tight condition prior to final pull-up and tightening. Thus, the second tapered surface 938 may help center the back ferrule (or the back end of a single ferrule in single ferrule fittings) in the nut body, especially the socket formed by the drive surface 932 and the first and second tapered surfaces 934 and 938. The second tapered surface 938 in this embodiment is radially outward of the drive surface 932, and also in this example is contiguous with the radial outer end of the drive surface 932 and the radial inner end of the first tapered surface 934. The second tapered surface 938 may be formed at an angle θ relative to the axis X, such as for example about 45°, but the selected angle for any particular application may be different and will be determined in part by the values of α and β. As an alternative embodiment, the surface 938 may be realized as a radius or curved surface or may have a compound geometry comprising any number of profiles and sections including straight, elliptical, radius and other portions. The socket defined by the surface 932, 934 and 938 may likewise have different geometric profiles and elements as needed, rather than the illustrated conical profiles of those surfaces. In addition to centering the back ferrule 936 in the nut 918, the second tapered surface 938 may further contribute to the benefits achieved by the first tapered surface 934 as described above with respect to the FIG. 1 and 1A embodiment.

The nut body 918 may thus further include a third tapered surface 940 that is axially aligned with a rearward portion of the front ferrule 942 and is radially outward of the drive surface 932 and the first and second tapered surfaces 934 and 938. This third tapered surface 940 may be formed at an angle λ, such as for example about 4°, similar to the angle 341 in the embodiment of FIG. 1A described hereinabove.

FIG. 7A illustrates a portion of the fitting 900 of FIG. 7 in a pulled-up condition in which the rear portion of the back ferrule 936 has been displaced radially outward and into increased engagement with the second or transitional tapered surface 938. Additionally, a radially outer portion of the front ferrule 942 has been displaced outward into contact with the third tapered surface 940. As shown, a gap may still remain between the radially outer portion of the back ferrule 936 and the first tapered surface 934. Contact between the back ferrule 936 and the first tapered surface 934 may occur during a subsequent pull-up of the fitting 900, after additional incremental outward displacement of the rear portion of the back ferrule 936 upon one or more additional fitting re-makes.

It will be noted that in the embodiment of FIG. 1A, there is a radial step region between the tapered surface 348 and the tapered surface 347. As an alternative, in the embodiment of FIGS. 7 and 8, a tapered transition 944 may be provided, formed at an angle τ relative to the axis X, such as for example, about 70°. This transition may ease manufacturing during the machining process. As with all the angle values described herein, other values may be used as needed. Typical ranges may include but need not be limited to the following examples: α from about 2° to about 25°; β from about 2° to about 25°; θ from about 30° to about 60°; λ from about 2° to about 25°; and τ from about 30° to about 88°.

The use of a second tapered surface between the nut drive surface and a first tapered surface in the nut socket that receives the back ferrule may also be applied to additional fitting embodiments and nut designs. For example, this additional tapered surface may be used with a male threaded nut such as illustrated in FIG. 5 hereof (adding a second tapered surface between the surface 549 and the surface 547 for example) or for the embodiments of FIGS. 3 and 4 hereof (adding a second tapered surface between the surfaces 447 and 449 for example.) The variations apply to single ferrule fittings and fittings with more than two ferrules and with fittings having significantly different ferrule or gripping device shapes and geometries.

FIGS. 9 and 10 illustrate another embodiment of one or more of the inventions. In this embodiment, a conduit fitting assembly 1000 may include two discrete conduit gripping devices in the form of a front ferrule 1002 and a back ferrule 1004 contained within an interior space 1005 by a female threaded drive nut 1006 and a male threaded body 1007, all disposed on a conduit C, such as tubing or pipe. With additional reference to FIGS. 7A and 8 hereinabove, in some fittings, the front and back ferrules 1002, 1004 may have approximately the same outer radial dimensions. This is in contrast to the front and back ferrules 942, 936 of FIGS. 7A and 8, in which the front ferrule 942 has an outer surface 380r (front ferrule major diameter) (FIG. 1A) of larger radial dimension than the outer surface 382r (back ferrule major diameter) (FIG. 1A) of the back ferrule 936. For example, FIGS. 7A and 8 may be typical for twelve millimeter and larger fittings, including half-inch fittings (herein fitting sizes generally refer to nominal tubing diameter), while FIGS. 9 and 10 may be typical for ten millimeter and smaller fittings, including quarter-inch fittings. In the case of smaller fittings, a third tapered surface, such as for example the third tapered surface 940 of FIGS. 7A and 8, may not be needed because of the smaller major diameter of the front ferrule 1002. The third tapered surface 940 in FIGS. 7A and 8 is used to accommodate the larger front ferrule 942, so that the third surface 940 is both axially aligned with the back end of the front ferrule and is spaced radially outward of the first tapered surface 934 that accommodates the back ferrule 936.

Although the exemplary embodiments herein of FIGS. 9-12 are suitable for such smaller fittings, such size limitations are not required, particularly for the second longitudinal surface 1012 described hereafter. Therefore, the use of the second longitudinal surface 1012 may well find application also to larger fittings if so needed, and in particular with ferrule sets in which the front ferrule has a larger major diameter than the back ferrule.

Therefore, in the exemplary embodiment of FIGS. 9 and 10, the female threaded nut 1006 may include a tapered drive surface 1008, a first longitudinal surface 1010 that extends in an axial direction along the nut body so as to axially align with portions of both the front ferrule 1002 and optionally the back ferrule 1004, and a second longitudinal surface 1012. The second longitudinal surface 1012, preferably although not necessarily, contiguously joins or is adjacent to the radial outer end 1014 of the tapered drive surface 1008. The second longitudinal surface 1012, preferably but not necessarily, also extends to be contiguous with or adjacent to an axially outboard end 1016 of the first longitudinal surface 1010.

The tapered drive surface 1008 tapers radially outward toward the inboard end of the drive nut 1006. The second longitudinal surface 1012 also tapers radially outward towards the inboard end of the drive nut 1006, but at a different angle than the angle of the drive surface 1008. The first longitudinal surface 1010 may be cylindrical (0° taper) or may optionally taper or have a portion that tapers radially outward toward the inboard end of the drive nut 1006. Exemplary angles for the first and second longitudinal surfaces 1010 and 1012 relative to the central longitudinal axis X, may be as set forth herein with respect to FIG. 8, where the first longitudinal surface 1010 may be angled similar to the surface 940 and the second longitudinal surface 1012 may be angled similar to the surface 938. For example, the first longitudinal surface 1010 may extend at an angle α of from zero degrees (cylindrical) to thirty or more degrees, and the second longitudinal surface 1012 may extend at an angle β of from about twenty degrees to about sixty degrees, but for both the first and second longitudinal surfaces 1010, 1012, other ranges of the angles may be used as needed. In a specific exemplary embodiment, the first longitudinal surface 1010 may extend at an angle α of about four degrees and the second longitudinal surface 1012 may extend at an angle β of about forty-five degrees. The drive surface 1008 may also be formed at any suitable angle relative to the X axis, typically about fifteen degrees or other suitable values may be used, typically in the range of about 2° to about 25°. Although the first and second longitudinal surfaces 1010, 1012 in the exemplary embodiment are frusto-conical, such a shape is not required and may have other contours and profiles as needed.

The second longitudinal surface 1012 forms a socket 1018 with the drive surface 1008 and optionally the first tapered surface 1010. This socket 1018 helps center the back end 1020 of the back ferrule 1004 in the nut 1006 during use, particularly during pull-up of the fitting 1000. As the fitting assembly is initially put together and with the back ferrule still loose within the socket 1018, the second longitudinal surface 1012 may assist in keeping the back ferrule aligned on-axis so that in the finger-tight position the back ferrule 1004 is nicely seated against the drive surface 1008. Having this alignment in the finger-tight position will reduce wasted stroke as the fitting 1000 is pulled-up during an initial pull-up (initial meaning the ferrules have not been previously deformed to grip and seal the conduit). This initial nesting of the back ferrule up against the drive surface 1008 also can minimize or eliminate eccentric bite angles of the forward edge 1011 into the conduit surface. Therefore, in a preferred embodiment, it is contemplated that in the finger-tight position the back ferrule back wall 1022 will not have to be in contact with the second longitudinal surface 1012, and preferably will not be in contact with the second longitudinal surface 1012 thereby assuring good alignment and contact with the drive wall 1008.

However, in the preferred embodiment it is further contemplated that during even the initial pull-up, that the back wall 1022 or at least a rearward portion of the back ferrule 1004 will come into contact with the second longitudinal surface 1012. This contact will provide a radial constraint against side to side movement of a rearward portion of the back ferrule which could produce an off-axis alignment of the back ferrule especially during initial pull-up and subsequent remakes. The second longitudinal surface 1012 thus helps to extend the number of available remakes by reducing wasted pull-up stroke and remake stroke. Contact between a rearward portion of the back ferrule 1004 and the second longitudinal surface 1012 during pull-up and remake in part may be attributed to the deformation that the back ferrule 1004 undergoes during pull-up in which the rearward portion 1040 of the back ferrule 1004 rotates radially outward and away from the conduit C surface. This rotation is due to a hinging effect as further illustrated below in which the rearward portion 1040 of the back ferrule rotates away from the conduit, but a central portion 1042 of the back ferrule is radially compressed inward to swage the back ferrule. The forward edge 1011 also is radially compressed inward to create a stress riser or bite to effect tube grip, so that a swaged region or portion thereof that is axially outboard of the bite isolates down-conduit vibration from the stress riser. This hinging action results in a distinctive convex shape to a portion of the inner bore 1009 of the back ferrule. But it is important to note that benefits from use of the second longitudinal surface 1012 may be realized with back ferrules that may deform differently from the exemplary embodiment herein, and also with single ferrule fittings.

The particular back ferrule design illustrated in FIGS. 9-10 is a commercially available ¼ inch (6 mm to 10 mm) ferrule available from Swagelok Company, Solon, Ohio. This back ferrule 1004 includes a number of geometry features that produce the hinging effect. The various geometry features can be individually optional depending on the size of the ferrule, but in general the back ferrule is designed so as to achieve the desired hinging effect which is exemplified by a rearward portion rotating radially away from the conduit, a central portion being radially rotated towards the conduit to swage the conduit, and the creation of a conduit bite or stress riser for gripping the conduit. The back ferrule 1004 in an unstressed state such as in FIG. 10 includes a central cylindrical bore 1009 which upon initial pull-up deforms to a convex shape. The swaged region may or may not align axially with the convex inner wall, but the convex wall, the swaged region, the front edge bite and the rearward portion rotation are characteristics of the hinging effect that has provided a highly successful commercial tube fitting. As to the geometry of the back ferrule, the hinging effect may be realized by the use of an interior radial recess 1044, as well as a tapered outer wall 1046. The back ferrule in some sizes may also include a contoured driven wall 1022. For the ¼ inch ferrule of FIG. 10, the driven wall 1022 is not contoured but rather frusto-conical. However, in FIG. 1A we illustrate a ½ inch back ferrule that does utilize a convex driven wall. In other sizes, for example a 1 inch back ferrule, the inner recess 1044 may be completely omitted and in lieu of a convex driven wall, the driven wall 1022 may initially (as in the finger-tight position) contact the drive wall 1008 at a location that is radially outward of the conduit, thus forming a difference angle between the taper angle of the drive wall and the taper angle of the driven wall (the convex drive wall of FIG. 1A is one example of a technique to form a difference angle between the driven wall of the back ferrule and the drive wall of the nut, exhibited by initial radial contact in the finger-tight position at a location that is radially outward of the conduit). The use of a convex drive wall or difference angle, a radial inner recess and the geometry of the outer wall, among other geometry aspects, will optionally vary depending on the size and materials being used for the tube fitting, but with the intent to achieve upon pull-up the ferrule shape that results from the desired hinging action.

Again, although the second longitudinal surface 1012 by itself is very useful with fittings that use the exemplary hinging back ferrules, other fitting and ferrule designs, as well as single ferrule fittings and fittings of different size, can benefit from the centering aspects of the second longitudinal surface 1012.

The second longitudinal surface 1012 also facilitates remakes of the fitting. Since the rearward portion 1040 of the back ferrule comes into contact with this surface 1012 preferably during the initial pull-up, the second longitudinal surface 1012 helps to constrain side to side motion that could result in off-axis misalignment of the back ferrule as the back ferrule deforms. In other words, if the back ferrule only were to contact the drive surface 1008, the deformation and stress that the back ferrule is subjected to during pull-up could cause slight axial offset misalignment. While this misalignment does not adversely impact the ability of the back ferrule to grip and seal the tube, it can waste stroke during remake and therefore may reduce the number of remakes available. The better the back ferrule remains centered in the drive nut for remakes, the more remakes can be achieved with less wasted stroke. Contact with the second longitudinal surface 1012 helps maintain the on-axis centering.

As noted hereinabove, the surface 938 of FIG. 8 can assist in centering the back ferrule for assembly to the finger-tight position, but we have also found that like the surface 1012, it can assist in centering during initial pull-up and remakes to increase remakes. In the finger-tight position illustrated, the back end 1020 of the back ferrule may somewhat contact the second longitudinal surface 1012 in the snugged-up finger-tight position but preferably would not because the surface 1012 will tend to urge the back ferrule back on-axis, and prior to such assembly, the loose back ferrule 1004 will self-center by nestling in the socket 1018. This improved centering of the back ferrule in the nut 1006 helps provide a smoother pull-up of the fitting by providing more uniform contact between the drive surface 1008 and the driven surface 1022 at the back end of the back ferrule. Although in the illustrated embodiment the driven surface 1022 may initially make flush contact with the drive surface 1008, such is not required. The driven surface 1022 may be contoured, for example, with a convex or other suitable shape, or there may be a difference angle between the two surfaces 1008, 1022, to name just two alternative examples.

For a typical ¼ inch fitting as illustrated in FIGS. 9 and 10, the second longitudinal surface 1012 may have a length of approximately 0.02 to approximately 0.06 inches, though other lengths may be used as needed. During an initial pull-up assuming normal 1 and ¼ turns from finger tight position, the back ferrule back end may move up the second longitudinal surface 1012 up to approximately .005 inches. However, if the assembler over-tightens, then the back end may move a few thousandths more. With each remake, the early remakes may move incrementally up to a few thousandths each time, but as more and more remakes occur the amount of movement diminishes. Therefore, the number of remakes available is facilitated by the centering second longitudinal surface 1012.

Although the exemplary fittings herein are typically pulled-up by turns, we also have discovered that the second longitudinal surface 1012 (as well as the surface 938) also can significantly improve pull-up by torque. This can be attributed again to the improved centering and maintaining good centering during initial pull-up and remakes so as not to waste stroke by having off-axis alignment of the back ferrule. Therefore the number of remakes can be substantially increase whether the fittings are pulled up by turns or torque. Also, maintaining on-axis centering may avoid torque increase due to misalignment and eccentric bite, thereby allowing for excellent pull-up and remakes by torque without having to specify an over-torque so as to assure proper conduit grip and seal.

Still further, as with the tapered surfaces in the above described embodiments, the second longitudinal surface 1012 may also assist in disassembly of the fitting by reducing the radial load on the back ferrule after the initial pull-up and after one or more remakes. This will be especially noted when the assembly 1000 is pulled-up without over-tightening so that the back ferrule remains in contact with the second longitudinal surface 1012.

Although the exemplary embodiment of FIG. 9 illustrates what is commonly known as a male fitting, in that the body 1007 is a male threaded part, the inventions may also be used with female fittings in which the body is a female threaded part. In common fitting terminology, the body is the component that receives the conduit end C1 and includes a camming surface 1024 against which the front ferrule 1002 engages during pull-up.

Note from FIG. 10 that in the finger-tight position, the back end 1026 of the front ferrule 1002 may be radially spaced from the first tapered surface 1010 by a gap 1030, and the back end 1020 of the back ferrule 1004 may be radially spaced from the first tapered surface 1010 by a gap 1032. Further note that the first tapered surface 1010 optionally may axially extend past the back end of the front ferrule 1002 in the finger-tight position, which assures that during pull-up the back end of the front ferrule will contact the first longitudinal surface 1010 when that surface is optionally tapered, and not a cylindrical surface such as the cylindrical surface 1034 that extends to the threaded portion of the nut. The first tapered surface 1010 need only axially extend forward towards the body 1007 sufficiently to assure axial positioning with respect to the back end of the front ferrule. This also assures that the second longitudinal surface 1012 is generally axially aligned with the back end 1020 of the back ferrule. Alternatively, the first tapered surface 1010 may extend even further axially towards the body 1007. The cylindrical surface 1034 may still be used to provide an appropriate surface to form the threaded connection 1036 between the nut 1006 and the body 1007.

The surface 1012 preferably may be sized relative to the back ferrule 1004 so as to contact the back ferrule during all remakes, especially for fittings that utilize a cylindrical first longitudinal surface 1010. In FIG. 8, because an additional tapered surface 934 may be provided, the back ferrule rearward portion may rotate into contact with the surface 934 during remakes. But with appropriate sizing of the second longitudinal surface 1012 relative to the size of the back ferrule, the benefits as to radial constraint and remakes may be realized for fittings that do not need or use the additional tapered surfaces of the other embodiments herein, especially for single ferrule fittings. For the FIG. 10 embodiment, the second longitudinal surface 1012 may be sized so as to maintain centering for many remakes, can provide the assist in disassembly by providing an axial reaction load, and can work with the optionally tapered first longitudinal surface 1010 after many remakes or over-tightening.

It should be noted that for fittings that will only be pulled up once or only one or two remakes, the tapered first longitudinal surface 1010 might not be needed so that the surface could be simply cylindrical. But even with one or two pull-ups, over-tightening may occur with some assemblers. For example, the fitting 1000 preferably is initially pulled up with 1 and ¼ turns past finger-tight position. If the assembler instead goes past 1¼ turns, having a tapered surface 1010 may assist in disassembly as the front ferrule may come into contact with that surface during over-tightening or multiple remakes. Therefore, the use of the tapered surfaces 1010 and 1012 together can significantly contribute to allowing for a higher number of remakes.

With reference next to FIGS. 13-14, we illustrate graphical representations of a ¼ inch fitting that uses tapered longitudinal surfaces 1010, 1012 in the drive nut 1004. FIGS. 13 and 14 compare the fitting in the finger-tight position and after 1 and ¼ turns past finger-tight position (i.e. normal initial pull-up). Note that various gaps are exaggerated due to scale of the drawing, but the basic concepts are fully represented. In the finger-tight position, the driven wall 1022 of the back ferrule 1004 engages with the drive surface 1008 of the drive nut 1006 and is nicely centered in the socket 1018. Preferably, the back ferrule 1004 does not come into contact with the second longitudinal surface 1012 in the finger-tight position. This lack of contact is also shown in FIG. 10. The radial gap between the major diameter 382*r* of the back ferrule and the second longitudinal surface 1012 may be quite small but preferably is present nonetheless. For example, the gap may be in the range of approximately 0.001 to approximately 0.01 inches, and more preferably approximately 0.001 to approximately 0.004 inches.

With reference to FIG. 14, we illustrate the fitting 1000 after an initial and normal complete pull-up using 1 and ¼ turns past the finger-tight position. In this example, the front and back ferrules 1002 and 1004 have been axially driven together by relative axial displacement between the nut 1006 and the body 1007 so as to deform to provide conduit grip and seal. In particular, as to the back ferrule 1004, the rearward portion 1040 has rotated radially outward as represented by the arrow R1, and the central portion 1042 has rotated radially inward as represented by the arrow R2. The front edge 1011 has also been driven radially into the conduit C so as to form a stress riser 1050 including a shoulder 1052 that provides excellent conduit grip by the back ferrule. A swaged region 1054 is also presented having a portion that is axially spaced outboard from the stress riser 1050, and a portion of the cylindrical interior wall 1009 (FIG. 10) has deformed to a convex shape 1056. Note further that a portion of the back ferrule 1004 now contacts the second longitudinal surface 1012. This contact with the second longitudinal surface will remain for subsequent remakes of the fitting, thus helping to radially constrain the back ferrule against side to side movement that could result in an off-axis alignment. This reduces wasted stroke to increase the number of available remakes and also provides an axial reaction force to assist in disassembly particularly after a number of remakes. Note that after a normal initial pull-up, the back end of the front ferrule does not contact the tapered first longitudinal surface 1010, but may come into contact with that surface after remakes, or perhaps after a pull-up that was done with a unnecessary amount of over-tightening, so that the tapered surface 1010 can provide axial reaction forces to assist in disassembly if needed.

For the fitting 1000 of FIGS. 9 and 10 then, such as may be used, for example, with 6-10 mm tubing, the drive nut 1006 may be provided with a tapered drive surface 1008, a first longitudinal surface 1010 that may optionally be tapered and may extend inboard to the threaded portion of the nut, and a second longitudinal surface 1012 that is tapered so as to provide centering and axial reaction forces for the back ferrule 1004 to significantly increase the number of available remakes. The second longitudinal surface 1012 may form an optionally continuous transition (as shown in the exemplary embodiment of FIG. 10) from the drive surface 1008 to the first longitudinal surface 1010 so that the nut socket comprises three basic surfaces, namely 1008, 1010 and 1012. This is in comparison to the embodiments of FIGS. 1A and FIG. 8 that may use not only additional longitudinal surfaces but also radial steps or transition regions to accommodate a larger front ferrule compared to the back ferrule. This nut geometry may be used, for example, in the ¼ inch design in which the front and back ferrules have approximately similar major outer diameters, or at least similar enough that another longitudinal surface is not needed that would be radially offset, as well as optionally back ferrules that hinge and deform during pull-up as set forth herein.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A drive nut for a conduit fitting, comprising:
   a female threaded drive nut body comprising an interior socket centered on a longitudinal axis and sized to receive a front ferrule and a back ferrule,
   said interior socket, when viewed in longitudinal cross-section, comprising:
   a drive surface that tapers radially outward and towards an inboard end of said drive nut body, said drive surface being tapered at a drive surface angle between approximately 2° to approximately 25° relative to said longitudinal axis;
   a first longitudinal surface that extends towards said inboard end of said drive nut body, said first longitudinal surface being tapered at an angle α between 0° to approximately 30° relative to said longitudinal axis, and
   a second longitudinal surface axially between said drive surface and said first longitudinal surface, said second longitudinal surface being tapered at an angle β between approximately 20° to approximately 60° relative to said longitudinal axis, said second longitudinal surface being contiguous with said drive surface and said first longitudinal surface, said angle α being different from said angle β and both said angle α and said angle β being different from said drive surface angle,
   wherein when the drive nut is assembled with the front ferrule and the back ferrule said first longitudinal surface will align axially with a rearward portion of the front ferrule and said second longitudinal surface will align axially with a rearward portion of the back ferrule, and said drive surface will contact a driven surface of the back ferrule.

2. The drive nut of claim 1, wherein said angle β of said second longitudinal surface is approximately 45° with respect to said longitudinal axis.

3. The drive nut of claim 1, wherein said angle α of said first longitudinal surface is between approximately 2° and approximately 25° with respect to said longitudinal axis.

4. The drive nut of claim 1, wherein said angle α of said first longitudinal surface is approximately 4° with respect to said longitudinal axis.

5. The drive nut of claim 1, wherein said interior socket comprises a threaded cylindrical portion at an inboard end thereof.

6. The drive nut of claim 1, wherein said second longitudinal surface is radially spaced from an outermost surface of said back ferrule when assembled to a finger-tight position.

7. The drive nut of claim 6, wherein said second longitudinal surface will contact said back ferrule after an initial pull-up and subsequent remakes.

8. The drive nut of claim 7, wherein said first longitudinal surface will contact said front ferrule after remake.

9. The drive nut of claim 1 comprising a female threaded portion at an inboard end thereof.

10. The drive nut of claim 9 wherein said female threaded portion is provided in a cylindrical surface that is contiguous with said first longitudinal surface.

* * * * *